United States Patent
Razdow

(10) Patent No.: US 9,779,082 B2
(45) Date of Patent: Oct. 3, 2017

(54) PORTABLE SELF-DESCRIBING REPRESENTATIONS OF MEASUREMENTS

(75) Inventor: Allen M. Razdow, Cambridge, MA (US)

(73) Assignee: True Engineering Technology, LLC, Boston, MA (US)

( * ) Notice: Subject to any disclaimer, the term of this patent is extended or adjusted under 35 U.S.C. 154(b) by 857 days.

(21) Appl. No.: 12/348,103

(22) Filed: Jan. 2, 2009

(65) Prior Publication Data

US 2009/0171625 A1  Jul. 2, 2009

Related U.S. Application Data

(60) Provisional application No. 61/018,576, filed on Jan. 2, 2008, provisional application No. 61/046,599, filed on Apr. 21, 2008.

(51) Int. Cl.
*G06F 17/27* (2006.01)
*G06F 17/30* (2006.01)
*G06F 17/22* (2006.01)

(52) U.S. Cl.
CPC ...... *G06F 17/2765* (2013.01); *G06F 17/2247* (2013.01); *G06F 17/271* (2013.01);
(Continued)

(58) Field of Classification Search
CPC ........... G06F 17/30731; G06F 17/2765; G06F 17/2705; G06F 17/271; G06F 17/272; G06F 17/278; G06F 17/2785; G06F 17/30607
See application file for complete search history.

(56) References Cited

U.S. PATENT DOCUMENTS 5,253,362 A  10/1993  Nolan et al. ................... 395/600
5,408,638 A *  4/1995  Sagawa et al. ................... 703/2
(Continued)

FOREIGN PATENT DOCUMENTS

WO  2009086562 A1  7/2009

OTHER PUBLICATIONS

Rodnay Zaks, "Programming the Z80", 1982.*
(Continued)

*Primary Examiner* — Rehana Perveen
*Assistant Examiner* — Huen Wong
(74) *Attorney, Agent, or Firm* — Cooley LLP

(57) ABSTRACT

A computer-implemented system and method creates and stores measurement statement objects representing complete statements of measurement. Each measurement statement object represents a measurement, such as "the left wing of the F-16 aircraft has a span of 36 m," and contains a value object, an aspect object, and an entity object. The value object represents a value of the measurement (such as 36 meters) and the aspect object represents an aspect of the measurement (such as span). The value is a value of the aspect of the measurement. The entity object represents an entity (such as the left wing of an F-16 aircraft) measured by the measurement. The aspect of the measurement is an aspect of the entity measured by the measurement $M_n$. Measurement statement objects may be created by parsing text describing measurements. Operations including computations, validation, searching, and reporting may be performed on measurement statement objects.

15 Claims, 8 Drawing Sheets

(52) U.S. Cl.
CPC ........ *G06F 17/272* (2013.01); *G06F 17/2705* (2013.01); *G06F 17/278* (2013.01); *G06F 17/2785* (2013.01); *G06F 17/30607* (2013.01); *G06F 17/30731* (2013.01)

(56) References Cited

U.S. PATENT DOCUMENTS

| | | | |
|---|---|---|---|
| 5,432,942 A | 7/1995 | Trainer | 395/700 |
| 5,469,538 A * | 11/1995 | Razdow | G06F 17/215 345/440 |
| 5,526,475 A * | 6/1996 | Razdow | G06F 17/215 708/443 |
| 5,689,632 A | 11/1997 | Galy et al. | 395/182.09 |
| 5,771,392 A * | 6/1998 | Razdow | G06F 17/16 708/607 |
| 5,799,151 A | 8/1998 | Hoffer | |
| 5,907,326 A * | 5/1999 | Atkin et al. | 715/866 |
| 5,915,116 A * | 6/1999 | Hochman | G06F 8/78 717/139 |
| 5,926,822 A | 7/1999 | Garman | 707/503 |
| 5,930,798 A * | 7/1999 | Lawler et al. | 707/694 |
| 6,018,628 A * | 1/2000 | Stoutamire | 717/147 |
| 6,202,208 B1 * | 3/2001 | Holiday, Jr. | 717/166 |
| 6,247,020 B1 | 6/2001 | Minard | |
| 6,301,582 B1 * | 10/2001 | Johnson | G06F 9/4435 |
| 6,330,008 B1 | 12/2001 | Razdow et al. | 345/772 |
| 6,374,252 B1 * | 4/2002 | Althoff et al. | |
| 6,385,769 B1 * | 5/2002 | Lewallen | 717/125 |
| 6,405,225 B1 | 6/2002 | Apfel et al. | 707/526 |
| 6,499,036 B1 * | 12/2002 | Gurevich | 707/778 |
| 6,560,774 B1 * | 5/2003 | Gordon et al. | 717/146 |
| 6,631,400 B1 | 10/2003 | DiStefano, III | |
| 6,675,230 B1 * | 1/2004 | Lewallen | G06F 9/4433 715/744 |
| 6,789,054 B1 | 9/2004 | Makhlouf | 703/6 |
| 6,801,938 B1 | 10/2004 | Bookman et al. | 709/224 |
| 6,813,762 B1 * | 11/2004 | Plaxton | G06F 9/44557 717/139 |
| 6,965,857 B1 | 11/2005 | Décary | 704/9 |
| 7,007,069 B2 | 2/2006 | Newman et al. | |
| 7,009,510 B1 | 3/2006 | Douglass et al. | |
| 7,171,418 B2 * | 1/2007 | Blessin | G06F 17/30557 |
| 7,366,727 B2 | 4/2008 | Heusermann et al. | |
| 7,392,280 B2 | 6/2008 | Rohall et al. | |
| 7,392,320 B2 | 6/2008 | Bookman et al. | 709/231 |
| 7,426,506 B2 | 9/2008 | Nunez | 707/3 |
| 7,747,240 B1 * | 6/2010 | Briscoe et al. | 455/405 |
| 7,958,257 B2 | 6/2011 | Gershinsky et al. | |
| 8,121,998 B2 * | 2/2012 | Razdow | G06F 17/2229 707/706 |
| 8,291,025 B2 | 10/2012 | Gupta et al. | |
| 8,438,229 B2 | 5/2013 | Razdow | |
| 8,452,842 B2 | 5/2013 | Gupta et al. | |
| 8,522,168 B2 | 8/2013 | Williams | |
| 8,615,707 B2 * | 12/2013 | Fortuna | G06F 17/30864 715/200 |
| 8,909,722 B2 | 12/2014 | Razdow et al. | |
| 2002/0013830 A1 * | 1/2002 | Stuckman et al. | 709/219 |
| 2002/0013835 A1 * | 1/2002 | Umezu et al. | 709/223 |
| 2002/0046201 A1 * | 4/2002 | Hembry | 707/1 |
| 2002/0080181 A1 | 6/2002 | Razdow et al. | 345/772 |
| 2002/0129177 A1 * | 9/2002 | McGuire et al. | 709/315 |
| 2002/0184401 A1 * | 12/2002 | Kadel, Jr. | G06F 8/76 719/315 |
| 2003/0074651 A1 * | 4/2003 | Allison | 717/143 |
| 2003/0105811 A1 * | 6/2003 | Laborde et al. | 709/203 |
| 2003/0158903 A1 | 8/2003 | Rohall et al. | |
| 2003/0163537 A1 | 8/2003 | Rohall et al. | |
| 2003/0177170 A1 * | 9/2003 | Glass | 709/203 |
| 2004/0015889 A1 * | 1/2004 | Todd | G06F 8/51 717/137 |
| 2004/0078476 A1 | 4/2004 | Razdow et al. | 709/229 |
| 2004/0143600 A1 * | 7/2004 | Musgrove | G06F 17/30864 |
| 2004/0172584 A1 | 9/2004 | Jones et al. | 715/500 |
| 2004/0225646 A1 * | 11/2004 | Sasaki | G06F 17/30684 |
| 2004/0267756 A1 * | 12/2004 | Bayardo et al. | 707/10 |
| 2005/0021745 A1 | 1/2005 | Bookman et al. | 709/224 |
| 2005/0171967 A1 * | 8/2005 | Yuknewicz | G06F 8/00 |
| 2005/0251534 A1 | 11/2005 | Nunez | 707/200 |
| 2005/0289182 A1 * | 12/2005 | Pandian | G06Q 10/10 |
| 2006/0041834 A1 * | 2/2006 | Chen | G06F 17/30896 715/205 |
| 2006/0080369 A1 | 4/2006 | Razdow et al. | 707/204 |
| 2006/0159096 A1 | 7/2006 | Gershinsky et al. | |
| 2006/0253566 A1 | 11/2006 | Stassinopoulos et al. | |
| 2007/0073592 A1 * | 3/2007 | Perry | G06Q 30/0603 705/26.1 |
| 2007/0073758 A1 * | 3/2007 | Perry | G06F 17/30864 |
| 2007/0239802 A1 * | 10/2007 | Razdow | G06F 17/2288 |
| 2008/0005240 A1 | 1/2008 | Knighton et al. | |
| 2008/0046520 A1 | 2/2008 | Jager et al. | |
| 2008/0089248 A1 | 4/2008 | Ushiyama et al. | |
| 2008/0221987 A1 * | 9/2008 | Sundaresan | G06Q 30/02 705/14.54 |
| 2008/0222261 A1 | 9/2008 | Razdow | 709/206 |
| 2008/0247532 A1 * | 10/2008 | Schulz | 379/220.01 |
| 2008/0270403 A1 | 10/2008 | Bookman et al. | 707/7 |
| 2009/0037895 A1 * | 2/2009 | Le Roy | 717/165 |
| 2009/0150495 A1 | 6/2009 | Sun et al. | |
| 2009/0150863 A1 * | 6/2009 | Guo et al. | 717/116 |
| 2010/0011302 A1 | 1/2010 | Stein et al. | |
| 2010/0185654 A1 * | 7/2010 | Fortuna | G06F 17/30011 707/769 |
| 2011/0099232 A1 | 4/2011 | Gupta et al. | |
| 2012/0079044 A1 | 3/2012 | Dunn | |
| 2012/0102015 A1 * | 4/2012 | D'Onofrio, II | G06F 17/30569 707/706 |
| 2012/0158872 A1 | 6/2012 | McNamee et al. | |
| 2012/0331063 A1 | 12/2012 | Rajaram | |
| 2013/0198308 A1 | 8/2013 | Yang et al. | |
| 2013/0246546 A1 | 9/2013 | Razdow | |
| 2015/0180814 A1 | 6/2015 | Razdow | |

OTHER PUBLICATIONS

Jose M. Garrido, "Object-Oriented Discrete-Event Simulation with Java", 2001, Kluwer Academic/Plenum Publishers.*
Parsons, "Object Oriented Programming with C++ 2nd Edition", 1997, Continuum.*
Lemay et al., "Teach Yourself JAVA in 21 Days", 1996, Sams Publishing.*
Singh, et al., *A Metadata Catalog Service for Data Intensive Applications*, Supercomputing, 2003 ACM/IEEE Conference (SC '03), Phoenix, Arizona, Nov. 15-21, 2003 (17 pgs.).
International Search Report based on PCT/US09/30020 dated Feb. 17, 2009.
U.S. Appl. No. 12/069,431, , "U.S. Appl. No. 12/069,431, Final Office Action dated Jun. 7, 2011", 7 pages.
U.S. Appl. No. 12/069,431, , "U.S. Appl. No. 12/069,431, Non-Final Office Action dated Dec. 1, 2009", 6 pages.
U.S. Appl. No. 12/069,431, , "U.S. Appl. No. 12/069,431, Non-Final Office Action dated Sep. 21, 2010", 6 pages.
Razdow, Allen, "Beehive Product Description: live parameters and calculations", A Beehive White Paper, Beehive Engineering Systems, Inc., Mar. 31, 2008, 15 pages.
Razdow, Allen, "Cyberspeak: architecture for a man-machine interface", A Beehive White Paper, Beehive Engineering Systems, Inc., Dec. 30, 2007, 8 pages.
Razdow, Allen, "Introducing the bscript language for engineering", A Beehive White Paper, Beehive Engineering Systems, Inc., Feb. 21, 2008, 6 pages.
Razdow, Allen, "Pervasive Engineering Knowledge Management: Speaking the engineer's language", A Beehive White Paper, Beehive Engineering Systems, Inc., Nov. 30, 2007, 16 pages.
Extended European Search Report dated Dec. 13, 2016 for European Application No. EP 09700101.0-1507.
U.S. Appl. No. 14/515,818, filed Oct. 28, 2014, Pending.

* cited by examiner

PORTABLE SELF-DESCRIBING REPRESENTATIONS OF MEASUREMENTS

CROSS REFERENCE TO RELATED APPLICATIONS

This application claims the benefit of and priority to U.S. Provisional Pat. App. Ser. No. 61/018,576, filed on Jan. 2, 2008, entitled "User Interface to Data Management System" and U.S. Provisional Pat. App. Ser. No. 61/046,599, filed on Apr. 21, 2008, entitled "User Interface to Data Management System," both of which are hereby incorporated herein by reference in their entirety.

FIELD

The present invention generally relates to systems and methods of acquiring and storing data relating to measurements, and more particularly to systems and methods of acquiring and storing data relating to measurements of physical entities.

BACKGROUND

Measurements are critical to the work performed by engineers. In their daily work, engineers constantly communicate, validate, and perform computations on the values of measurements. Engineers spend a significant portion of their time engaging in such activity. Furthermore, even a small error in a measurement of a product design, such as the span of an aircraft wing, or a value computed from that measurement, can cause serious defects in the product design and have other negative consequences.

Engineers often communicate measurements to each other by writing documents describing those measurements using phrases such as "the left wing of the F-16 aircraft has a span of 36 m." Such documents are often written using conventional word processing software and stored in conventional word processing document formats. Engineers also create descriptions of measurements in a variety of other computer-readable forms, such as spreadsheets and email messages. The descriptions of measurements contained within such documents, spreadsheets, and email messages are often interspersed with other kinds of information, such as notes from the engineer to himself about how the measurement was obtained, what the purpose of the measurement is, or whether the measurement is actual or estimated.

Measurements represented in these and other conventional formats typically cannot be interpreted and processed by software for purposes of performing searches, reporting, validation or computations on the number measurement (e.g., 36 m in the example above), because the software cannot interpret the content of a phrase such as "the left wing of the F-16 aircraft has a span of 36 m," particularly when such a phrase is interspersed with other, non-measurement-related text, in the same document. As a result, a memo containing such a phrase is useful primarily as a one-time communication from one engineer to another. To make further use of the same measurement, such as to perform a calculation involving the span of the F-16 aircraft's left wing, the engineer must re-enter the number "36" into a calculator or other calculation tool and manually perform the desired calculation.

Such calculations, however, can fail to provide the engineer, and other engineers, with important information. For example, assume that the engineer add 36 to 24 to produce the product 60 and then uses this result in further computations. Recall that the number 36 was derived from a measurement of the span of the left wing of an aircraft. If the number 24 was mistakenly derived from the span of the rudder, rather than from the span of the right wing, the resulting sum of 60 may be mathematically correct but fail to alert the engineer to the fact that the wrong calculation was performed. If the engineer communicates this result to other engineers, they too will remain unaware of the error.

Given the importance of measurements to engineers and others who work with measurements, the current state-of-the-art both requires users to engage in tedious manual data entry and calculation, and fails to provide additional functionality that would be useful to engineers in performance of their work.

SUMMARY

A computer-implemented system and method creates and stores measurement statement objects representing complete statements of measurement. Each measurement statement object represents a measurement, such as "the left wing of the F-16 aircraft has a span of 36 m," and contains a value object, an aspect object, and an entity object. The value object represents a value of the measurement (such as 36 meters) and the aspect object represents an aspect of the measurement (such as span). The value is a value of the aspect of the measurement. The entity object represents an entity (such as the left wing of an F-16 aircraft) measured by the measurement. The aspect of the measurement is an aspect of the entity measured by the measurement $M_n$. Measurement statement objects may be created by parsing text describing measurements. Operations including computations, validation, searching, and reporting may be performed on measurement statement objects.

For example, one embodiment of the present invention is directed to a data structure tangibly embodied on a computer readable storage medium. The data structure comprises a plurality of measurement statement objects S representing a plurality of measurements M. Each of the plurality of measurement statement objects $S_n$ corresponds to a particular one of the plurality of measurements $M_n$ and comprises: a value object representing a value; an aspect object representing an aspect of the measurement $M_n$, wherein the value is a value of the aspect of the measurement $M_n$; and an entity object representing a physical entity measured by the measurement $M_n$, wherein the aspect of the measurement $M_n$ is a measurable aspect of the physical entity measured by the measurement $M_n$.

Another embodiment of the present invention is directed to a computer system comprising: a computing device and a computer-readable medium operatively connected to the computing device. The computer-readable medium contains thereon computer-executable instructions comprising a parsing module. The parsing module is configured to parse statement text into a first measurement statement object representing a first measurement. The first measurement statement object comprises: a first value object representing a first value; a first aspect object representing a first aspect of the first measurement, wherein the first value is a value of the first aspect; and a first entity object representing a first physical entity measured by the first measurement, wherein the first aspect is a measurable aspect of the first physical entity. The parsing module is further configured to store the first measurement statement object on the computer-readable medium.

Another embodiment of the present invention is directed to a computer-implemented method comprising: (A) receiving, over a network, statement text; (B) parsing, using at least one computing device, the statement text to create a first measurement statement object; and (C) storing the first measurement statement object on a computer-readable medium. The first measurement statement object comprises: (A) a first value object representing a first value; (B) a first aspect object representing a first aspect of the first measurement, wherein the first value is a value of the first aspect; and (C) a first entity object representing a first physical entity measured by the first measurement, wherein the first aspect is a measurable aspect of the first physical entity.

Yet another embodiment of the present invention is directed to a computer-implemented system comprising: a computing device; a first computer-readable medium operatively connected to the computing device; and (C) a second computer-readable medium operatively connected to the computing device. The first computer-readable medium tangibly stores a plurality of measurement statement objects S representing a plurality of measurements M. Each of the plurality of measurement statement objects $S_n$ corresponds to a particularly one of the plurality of measurements $M_n$ and comprises: a value object representing a value; (an aspect object representing an aspect of the measurement $M_n$, wherein the value is a value of the aspect of the measurement $M_n$; and an entity object representing a physical entity measured by the measurement $M_n$, wherein the aspect of the measurement $M_n$ is a measurable aspect of the physical entity measured by the measurement $M_n$. The second computer-readable tangibly stores computer-executable instructions for: performing a measurement statement computation on a first one of the plurality of measurement statement objects to produce an output measurement statement object, the measurement statement computation including a value computation on the value represented by the value object of the first one of the plurality of measurement statement objects to produce an output value object representing an output value. The output measurement statement object includes: the output value object; an output aspect object representing an output aspect, wherein the output value is a value of the output aspect; and an output entity object representing an output physical entity, wherein the output aspect is a measurable aspect of the output physical entity.

Yet a further embodiment of the present invention is directed to a computer-implemented method comprising: (A) receiving an input measurement statement object, tangibly stored on a computer-readable medium accessible to a computing device, wherein the input measurement statement object represents an input measurement. The input measurement statement object comprises: an input value object representing an input value; an input aspect object representing an aspect of the input measurement, wherein the input value is a value of the input aspect; and an input entity object representing an input physical entity measured by the input measurement, wherein the input aspect is a measurable aspect of the input physical entity. The method further comprises: (B) generating, using the computing device, an output value object, tangibly stored on the computer-readable medium, by performing a measurement statement computation on the input measurement statement object. The output measurement statement object comprises: an output value object representing an output value that is a result of performing a value computation on the input value; an output aspect object representing an output aspect, wherein the output value is a value of the output aspect; and an output entity object representing an output physical entity, wherein the output aspect is a measurable aspect of the output physical entity.

Yet another embodiment of the present invention is directed to a computer-implemented system comprising: a computing device; a first computer-readable medium operatively connected to the computing device; and a second computer-readable medium operatively connected to the computing device. The first computer-readable medium tangibly stores a first measurement statement object representing a first measurement. The first measurement statement object comprises: (A) a first value object representing a first value; (B) a first aspect object representing an aspect of the first measurement, wherein the first value is a value of the first; and (C) a first entity object representing a first physical entity measured by the first measurement, wherein the first is a measurable aspect of the first physical entity. The second computer-readable medium tangibly stores computer-executable instructions for determining whether the first aspect is consistent with the first value.

Yet a further embodiment of the present invention is directed to a computer-implemented method comprising: (A) receiving a first measurement statement object, tangibly stored on a computer-readable medium operatively connected to a computing device. The first measurement statement object represents a first measurement. The first measurement statement object comprises: (A) a first value object representing a first value; (B) a first aspect object representing an aspect of the first measurement, wherein the first value is a value of the first; and (C) a first entity object representing a first physical entity measured by the first measurement, wherein the first is a measurable aspect of the first physical entity. The method further comprises: (B) determining whether the first aspect is consistent with the first value.

DETAILED DESCRIPTION

Embodiments of the present invention are directed to computer-implemented systems and methods for creating statements of measurement (also referred to herein as "measurement statements"), for storing representations of such statements of measurement, and for performing computations on such statements of measurement. For example, referring to FIG. 1A, a dataflow diagram is shown of a computer system 100 for storing a plurality of measurement statement objects 108a-n according to one embodiment of the present invention, where n may be any number.

The system 100 includes a measurement statement object store 106, tangibly stored in a computer-readable medium 104, which contains the plurality of measurement statement objects 108a-n. The measurement statement object store 106 may be implemented in any form, such as a database or other data structure. The computer-readable medium 104 may be contained within, or otherwise be accessible to and readable and/or writable by, a computing device 102.

Each of the measurement statement objects 108a-n represents a particular corresponding measurement. Examples of measurement statements that may be represented by individual measurement statement objects include, "the left wing of the F-16 aircraft has a span of 36 m," "the thickness of a protective oxide layer is 47.5 microns," and "the maximum inside diameter of the fuel pump's exit pipe is 2.5 cm."

Figure 1A:
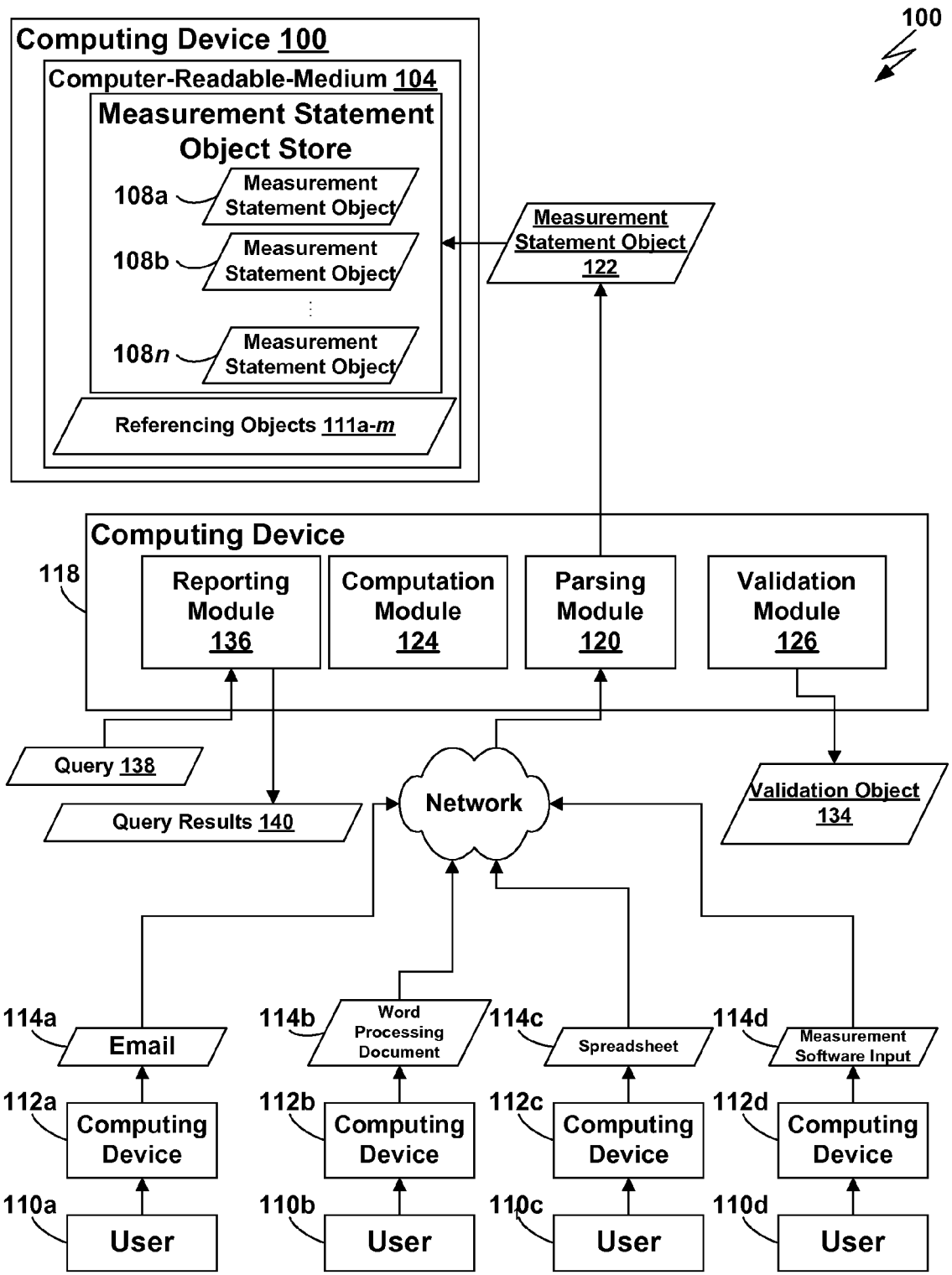
FIG. 1A is a dataflow diagram of a computer-implemented system for creating, storing, computing, validating, searching, and reporting on measurement statement objects representing measurements according to one embodiment of the present invention.
Figure 1B:
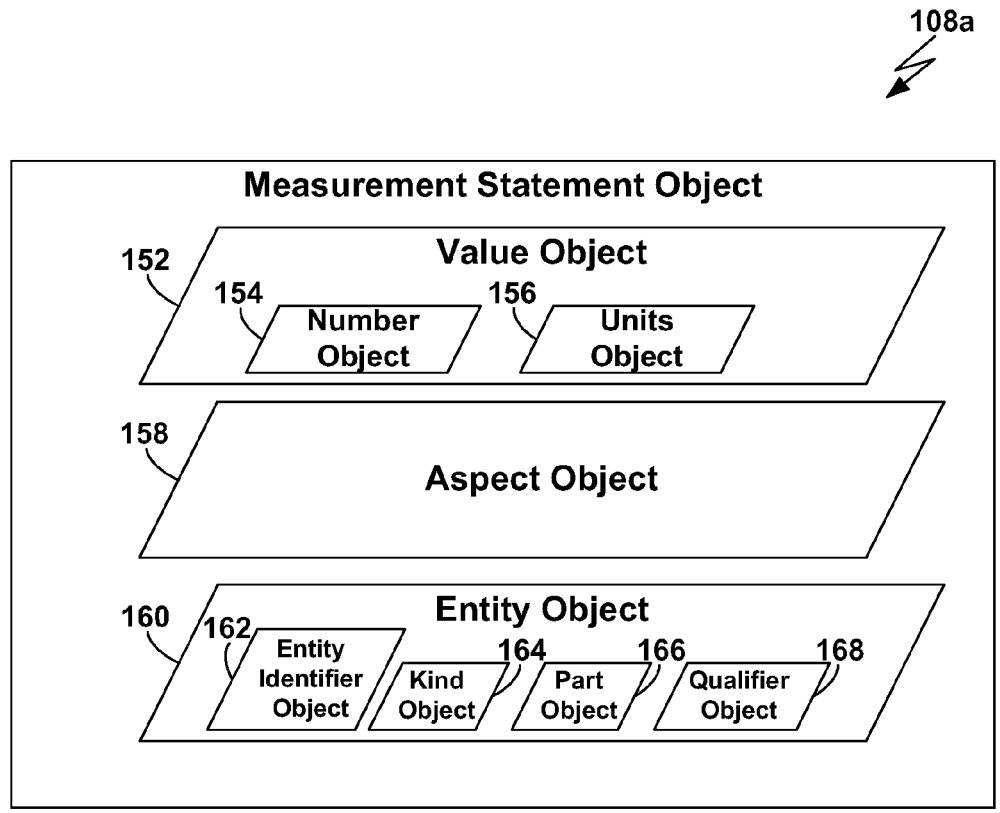
FIG. 1B is a diagram of a data structure for storing a measurement statement object according to one embodiment of the present invention.

Referring to FIG. 1B, the measurement statement object 108a is shown in more detail according to one embodiment of the present invention. Although only the measurement statement object 108a is shown in FIG. 1B, the other measurement statement objects 108b-n may have the same or similar structure as that shown in FIG. 1B. The measurement statement object 108a includes a value object 152, representing a value such as 36 m, 47.5 microns, or 2.5 cm. The measurement statement object 108a, however, includes more than just the value object 152. The measurement statement object 108a includes additional objects representing information which provides context to the measurement's value. For example, the text "the left wing of the F-16 aircraft has a span of 36 m" provides contextual information indicating that the value "36 m" is a value of a span of an entity, and that the entity in question is the left wing of an F-16 aircraft. As will be described in more detail below, such contextual information is explicitly represented and stored within the corresponding measurement statement object 108a, where it may be used by the system 100 to perform functions such as computation, validation, searching, and reporting in ways that are not possible in conventional systems that merely store representations of numbers out of context.

For purposes of further example, assume that the measurement statement object 108a represents the measurement described by the text, "the left wing of the F-16 aircraft has a span of 36 m." In addition to the value object 152, the measurement statement object 108a includes an aspect object 158 and an entity object 160. As stated above, the value object 152 represents a value associated with the measurement represented by the measurement statement object 108a. In the example just provided, the value object 152 represents the value "36 m."

In this example, the value object 152 includes both a number object 154 representing a number (36) and a unit object 156 representing a type of units (meters). Value objects need not, however, include both number objects and unit objects. For example, a value object may include a number object and no other object. As further examples, a value object may include objects representing a magnitude of the number, a decimal exponent of the number, and/or a precision of the number. As another example, a value object may represent a value other than a number, such as a color or other quality. More generally, a value object may represent any kind of value of the corresponding measurement, represented in any way.

As mentioned above, the measurement statement object 108a also includes aspect object 158, which represents an aspect of the measurement represented by the measurement statement object 108a. In the example above, the aspect represented by the aspect object 158 is "span." The value (36 meters in this example) represented by the value object 152 is a value of the aspect (span in this example) represented by the aspect object 158.

As mentioned above, the measurement statement object 108a also includes entity object 160, which represents an entity measured by the measurement represented by the measurement statement object 108a. In the example above, the entity is the left wing of the F-16 aircraft. The aspect (e.g., span) is an aspect of the measured entity (e.g., the left wing of the F-16 aircraft). An entity may be any kind of entity susceptible to measurement, such as a physical product (e.g., an airplane, building, or computer), a service (such as a consulting service or utility service), a project, or a financial instrument.

An aspect may be any measurable aspect of an entity. The result of measuring an aspect of an entity is a value of the measurement. Examples of aspects include, but are not limited to, height, width, depth, span, thickness, area, distance, separation, radius, diameter, bore, wavelength, coordinates, position, mass, weight, load, tonnage, value, price, cost, shear, yield point, modulus of elasticity, voltage, resistance, capacitance, inductance, duration, interval, period, time span, speed, acceleration, factor, ratio, coefficient, and specific gravity.

The measurement statement objects 108a-n may be represented in any form, such as by objects in an object-oriented programming language, records in a database, meta-data in a document, or triple in a Resource Description Framework (RDF) description. These are merely examples of ways in which measurement statement objects 108a-n may be represented, and do not constitute limitations of the present invention.

The entity object 160 may include an identifier object 162 representing an identifier of the measured entity, such as "F-16." The entity identifier object 162 may take any form, such as plain text or a token. The entity object 160 may further include a kind object 164, which represents the kind of entity represented by the entity object 160. In the example above, the measurement statement text states that "the F-16 aircraft . . . ." This indicates that the measured entity (the F-16) is a kind of aircraft. Such a "kind-of" relationship between "F-16" and "aircraft" (also referred to as an "is-a" relationship) may be represented within the entity object 160 itself by the kind object 164.

Furthermore, the entity object may include an object 166 representing the part of the entity represented by the entity object 160. In the example above, the measurement statement text states that "the left wing of the F-16 aircraft . . . ." This indicates that the "left wing" is a part of the F-16. Such a "part-of" relationship between "left wing" and "F-16" (also referred to as a "has-a" relationship") may be represented within the entity object 160 itself by the part identifier object.

In summary, each of the measurement statement objects 108a-n represents a particular measurement of a particular entity. The entity, in other words, is the subject of the measurement represented by the corresponding one of the measurement statement objects 108a-n. Taking the measurement statement object 108a as representative of the plurality of measurement statement objects 108a-n, the measurement statement object 108a includes entity object 160, representing the measured entity, and aspect object 158, representing an aspect (such as a property or predicate) of the measured entity. The measurement statement object 160 further includes value object 152, representing a value of the aspect of the measured entity.

One benefit of using the measurement statement object 108a to represent a measurement is that the aspect object 158 and entity object 160 provide context to the value represented by the value object 152 and thereby complete the measurement statement of which the value is a part. For example, "the F-16 aircraft's left wing has a span of" completes the measurement represented by the bare number "36." As will be described in more detail below, providing such complete statements of measurement can enable the system 100 to perform a wider variety of richer computations on the value than if the measurement statement object 108a contained a representation of the value but not of the aspect or the entity.

Elements of the measurement statement object 108a, such as the entity object 160, aspect object 158, and value object 152, may be represented using a data structure referred to herein as a "structured resource descriptor" (SRD). In general, a structured resource descriptor describes a particular resource using: (1) a resource identifier identifying the resource being described and (2) at least one of the following: (a) an "is a" (kind of) operator specifying the kind of resource being described; and (b) a "has a" (part) operator specifying a part of the resource being described. For example, the entity object 160 illustrated in FIG. 1B is represented by an SRD, because the entity object 160 includes a resource identifier (i.e., the entity identifier object 162), a kind of operator (i.e., the kind object 164), and a part of operator (i.e., the part object 166). An SRD may, however, include additional operators, such as an aspect (property) operator and a qualifier operator.

For instance, one example of an SRD is "Aircraft:F-16/wing[left].span=36 m." In this example, ":" is the "is a" (kind) operator (which could be represented by the kind object 164 in FIG. 1B). Therefore, this SRD indicates that "F-16" is a kind of "Aircraft." In this example, "/" is the "has a" (part) operator (which could be represented by the part object 166 in FIG. 1B0. Therefore, this SRD indicates that the "F-16" has a "wing." In this example, "[ ]" is the "qualifier" operator (which could be represented by a qualifier object 168 in FIG. 1B). Therefore, this SRD indicates that the "wing" being described is the "left" wing of the "F-16." Finally, in this example, "." is the "aspect" (property) operator (which could be represented by the aspect object 158 in FIG. 1B). Therefore, this example indicates that the left wing of the F-16 has a span of 36 meters.

Although in the particular example illustrated in FIG. 1B, only the entity object 160 includes the elements of an SRD, this is merely an example and does not constitute a limitation of the invention. More generally, any element or elements of the measurement statement object 108a, in any combination, may be represented by SRDs. For example, the aspect object 158 may be represented by an SRD, in which case the aspect object 158 may include an identifier object, kind object, and part object. Similarly, the value object 152 may be represented by an SRD, in which case the value object 152 may include an identifier object, kind object, and part object.

One benefit of the SRD is that it enables components of a measurement, such as its value, aspect, and entity, to be explicitly represented and stored in a format (such as the measurement statement object 108a shown in FIG. 1B) that can be easily processed by a computer (such as the computing device 102 shown in FIG. 1A). As a result, and as will be described in more detail below, once a measurement is stored in the form of an SRD, computations can be performed on SRDs that take into account not only the value of the measurement (e.g., "36 m") but also the aspect and/or entity of the measurement. This enables functions to be performed that cannot be performed by conventional systems, such as signaling a warning if an attempt is made to add values from two different entities (e.g., the span of an F-16 wing to the thickness of an oxide layer) or two different aspects (e.g., the span of an F-16 wing to the weight of the same F-16 wing).

Another benefit of the SRD is that it uses a structure that is derived from the way engineers and others think about, and hence describe, measurements. For example, consider the SRD, "Aircraft:F-16/wing[left].span=36 m," and text the SRD represents, "the left wing of the F-16 aircraft has a span of 36 m." This SRD and corresponding natural-language text, of the kind that may be written by an engineer in a memo, share various structural similarities. First, both specify not only the value of the measurement (36 meters), but also the aspect (span) and entity (left wing of the F-16 aircraft) of the measurement. Second, both begin by specifying the entity, followed by the aspect, followed by the value. Although SRDs are not required to have all of these features, imbuing SRDs with such features can be particularly beneficial for representing information about measurements that is useful to engineers, performing computations on such information, creating SRDs based on descriptions of measurements written by engineers, and displaying information about measurements to engineers.

The measurement statement objects 108a-n may be created in any manner. For example, they may be created directly by computer software and/or hardware, or derived from descriptions of measurements created by engineers or other users. Such user-generated descriptions may be provided in any of a variety of ways and take any of a variety of forms. For example, measurement descriptions may be provided within word processing documents, spreadsheets, or email messages, in the same documents as other content not intended for use in creating the measurement statement objects 108a-n. As another example, users may input descriptions of measurements into a special software program dedicated to that purpose, or into a special window or other input mechanism provided by a software program (e.g., a word processor) that is otherwise dedicated to other purposes. Such an input mechanism may allow or require the user to describe a measurement in a relatively unstructured format (such as by typing the text, "the maximum inside diameter of the fuel pump's exit pipe is 2.5 cm") or in a relatively structured format (such as by filling in a form containing separate fields for distinct elements of the measurement statement object, such as its value, aspect, and entity).

Furthermore, processing operations (such as computations and validation) may be performed on the measurement statement objects 108a-n regardless of how such objects were created. Certain embodiments of the present invention, however, are directed to techniques for deriving measurement statement objects from content created by engineers or other users, as further illustrated by the system 100 of FIG. 1A and the flowchart of a method 200 shown in FIG. 2A.

A plurality of users 110a-d of the system 100 use computing devices 112a-d to create content 114a-d, respectively. (Although only four users 110a-d are shown in FIG. 1A for purposes of example, the system 100 may include any number of users.) Such user-created content 114*a-d* may, for example, be email messages 114*a*, word processing documents 114*b*, spreadsheets 114*c*, input 114*d* provided to a software program designed specifically to receive descriptions of messages, or any other kind of content that can be created by the users 110*a-d* using computing devices 112*a* and stored on computer-readable media. The content 114*a-d* may include, for example, text, images, audio, video, or any combination thereof. Furthermore, the computing devices 112*a-d* may process input provided by the users 110*a-d* to create the resulting content 114*a-d*. For example, user 110*a* may speak into a microphone to create an audio stream which is transformed into text by an automatic speech recognizer executing on the computing device 112*a*, which stores the resulting text as part of the email message 114*a*.

Assume for purposes of example that the users 110*a-d* are engineers working for a single company. Note, however, that this is not a requirement of the present invention. There need not be any relationship among the users 110*a* of the system 100. Certain embodiments of the present invention, however, are particularly useful when used in conjunction with a community of users working for a single entity, on a single project, or in a shared domain which benefits from re-use of user-created content.

The engineer-users 110*a-d* may, for example, create the content 114*a-d* by engaging in their normal day-to-day work. For example, the user-created content 114*a-d* may include word processing documents 114*b* containing memos written by the engineers 110*a-d* to each other about their research and designs; email messages 114*a-d* sent among engineers 110*a-d* exchanging information and conclusions; and spreadsheets 114*c* containing results of experiments performed by the engineers 110*a-d*. Such content 114*a-d* may be created, stored, modified, and transmitted across a network 116 in the conventional ways in which such content 114*a-d* is created, stored, modified, and transmitted. For example, the engineers 110*a-d* may use conventional word processing software to create the documents 114*b* and to store such documents 114*b* in conventional word processing document formats. Similarly, the engineers 110*a-d* may use conventional email software to create email messages 114*a* and to transmit such messages 114*a* using conventional email protocols. As a result, various embodiments of the present invention do not require the engineers 110*a-d* to learn or apply special techniques to create, store, modify, or transmit the content 114*a-d*.

The user-created content may include statements written in a natural language, such as English. For example, consider FIG. 3A, which illustrates an example of text contained within one of the word processing documents 114*b*, namely the text:

The following is a description of our current design for the new F-16. This design is preliminary and has not been tested. The left wing of the F-16 aircraft has a span of 36 m. The span of the aircraft's right wing is the same as that of the left wing . . . .

The first sentence 302*a* of this memo describes the purpose of the memo using a description written in a natural language, namely English. The second sentence 302*b* provides further background information about the memo. The third sentence 304 describes a measurement of the span of the proposed F-16's left wing, measured in meters. The third sentence 304, therefore, describes a measurement and therefore is an example of "measurement statement text," as that term is used herein. The fourth sentence 306 also describes a measurement (of the span, in meters, of the proposed F-16's right wing), and therefore is also an example of measurement statement text.

The author 110*b* of the memo 114*b* may write it as part of performing any kind of work. For example, the author 110*b* may have measured the actual length of a physical prototype of an airplane before writing the memo, in which case the third and fourth sentences 304 and 306 may reflect actual measurements of the physical prototype. As another example, the third and fourth sentences 304 and 306 may represent descriptions of existing airplane designs, or descriptions of proposed, but not yet constructed, airplane designs.

Figure 2A:
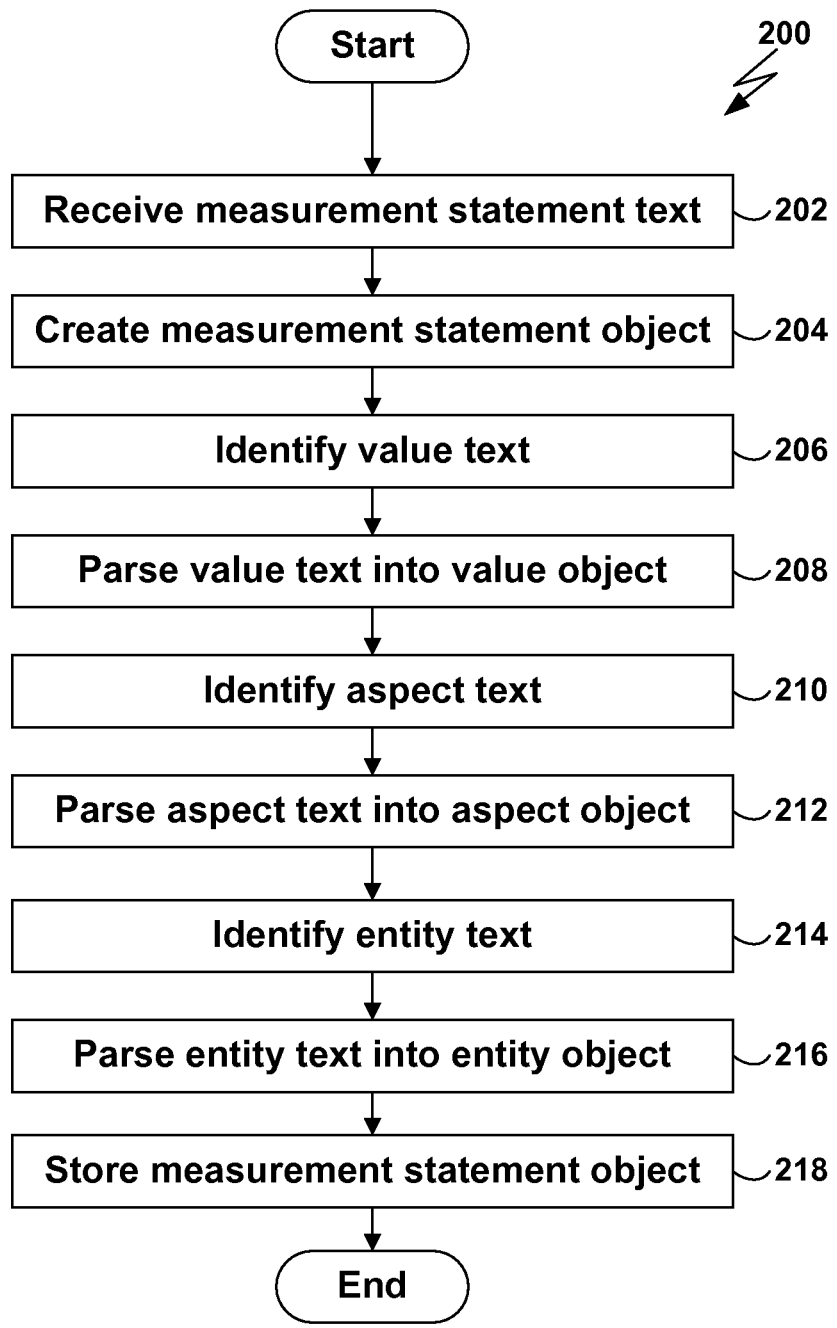
FIG. 2A is a flowchart of a method for parsing text into a measurement statement object according to one embodiment of the present invention.

The system 110 may include at least one computing device 118 containing a parsing module 120. The parsing module 120 is configured to parse measurement statement text into measurement statement objects 108*a-n*, which represent measurements described by the measurement statement text. More specifically, and referring to FIG. 2A, in general the parsing module 120 may parse a particular instance of measurement statement text into a measurement statement object as follows. The parsing module 120 receives the measurement statement text over the network 116 or in another manner (FIG. 2A, step 202). The measurement statement text may, for example, be the third sentence 304 in the document 114*b* shown in FIG. 3A.

The parsing module 120 creates a measurement statement object 122 to represent the measurement described by the measurement statement text (step 204). The measurement statement object 122 may have the structure shown in FIG. 1B. The parsing module 120 identifies value text, such as the text "36 m" in sentence 304, representing a value in the measurement statement text (step 206). The parsing module 120 parses the value text into a value object (e.g., of the type shown as object 152 in FIG. 1B) that the parsing module 120 stores in the measurement statement object 122 (step 208).

Similarly, the parsing module 120 identifies aspect text, such as the text "span of" in sentence 304, representing an aspect of the measurement statement text (step 210). The parsing module 120 parses the aspect text into an aspect object (e.g., of the type shown as object 158 in FIG. 1B) that the parsing module 120 stores in the measurement statement object 122 (step 212).

Finally, the parsing module 120 identifies entity text, such as the text "the left wing of the F-16 aircraft" in sentence 304, representing an entity described by the measurement statement text (step 214). The parsing module 120 parses the entity text into an entity object (e.g., of the type shown as object 160 in FIG. 1B) that the parsing module 120 stores in the measurement statement object 122 (step 216). As this example illustrates, the parsing module 120 may parse text representing resource identifiers, "is a" (kind of) relationships, and "has a" (part of) relationships into SRDs, and may do so not only for entities, but also for aspects, values, and other elements.

Although not shown in FIG. 2A, the parsing module 120 may parse additional text, such as text representing qualifiers, precision, and other metadata, into the measurement statement object 122. Once the parsing module 120 has created the measurement statement object 122, the parsing module 120 stores the measurement statement object 122 in the measurement statement object store 106 on the computer-readable medium 104, in the form of one of the measurement statement objects 108*a-n* (step 218).

Figure 2B:
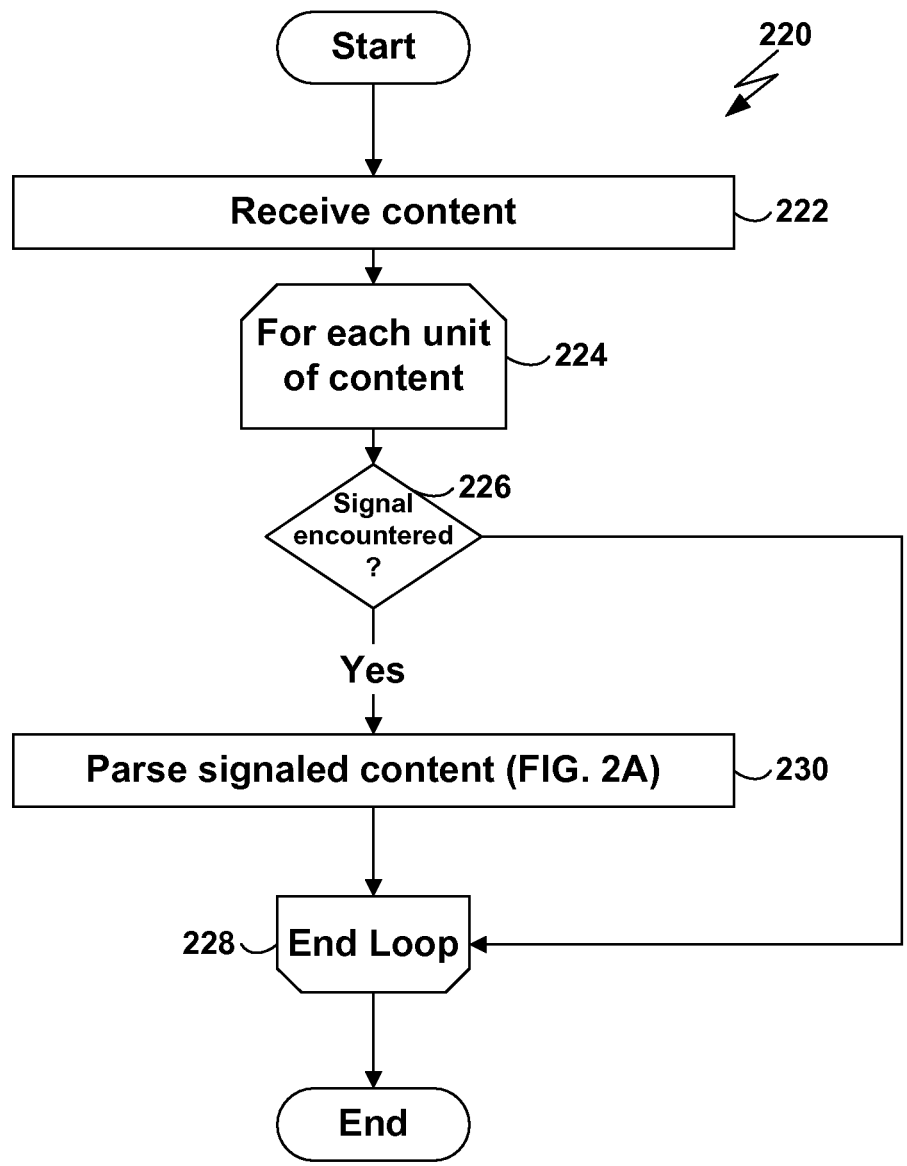
FIG. 2B is a flowchart of a method for parsing only text indicated by signals into a measurement statement object according to one embodiment of the present invention.

In the method 200 of FIG. 2, the parsing module parses all measurement statement text that it receives. This is merely an example and does not constitute a requirement of the present invention. Rather, the parsing module may be instructed to parse particular content, or otherwise be caused to parse particular content, in any of a variety of ways. For example, as illustrated by the method 220 of FIG. 2B, the parsing module 120 may receive (step 222) and scan content (step 224), such as the memo 114b shown in FIG. 3A, but only attempt to parse portions of the content that contain predetermined "signals." More specifically, the parsing module 120 may search through the content until it encounters a recognized signal (step 226) and, upon encountering such a signal, parse the content associated with that signal (step 230), such as by using the techniques described above with respect to FIG. 2A. The parsing module 120 may repeatedly scan and parse units of the content until the parsing module 120 has scanned through the entire content (step 228).

For example, the parsing module 120 may recognize certain predetermined signals as indicators that the text immediately following the signal represents measurement statement text to be parsed into a measurement statement object. Such signals may, for example, be patterns of text which are unlikely to appear in natural language text, such as "--" (double dash), "//" (double slash), or another other combination of characters. Both prefix signals and suffix signals may be used, such that the parsing module 120 only attempts to parse text between a matching pair of prefix and suffix signals (e.g., "//The left wing of the F-16 aircraft has a span of 36 m.//"). The parsing module 120 may, therefore, by default not attempt to parse text in any particular unit of content, and only attempt to parse text when prompted to do so by an appropriate signal in the text. Users 110a-d may intentionally include signals in the content 114a-d they create to indicate to the parsing module 120 that the signaled text is to be parsed.

Figure 3A:
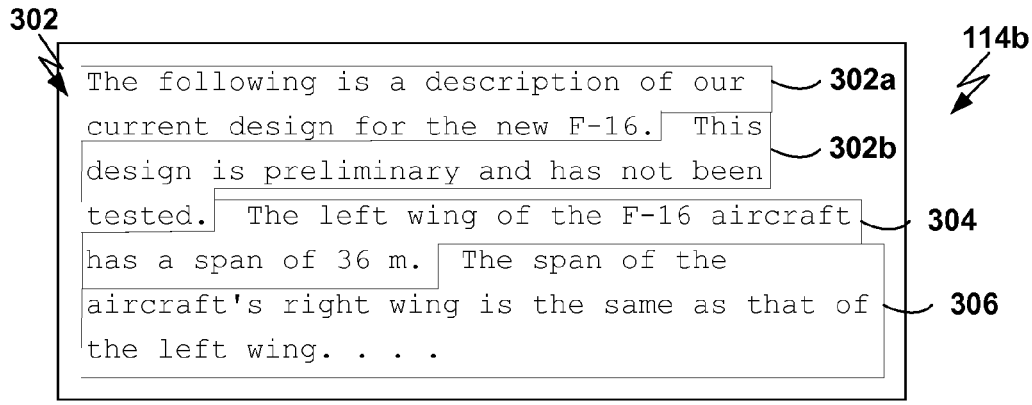
FIG. 3A, FIG. 3B and FIG. 3C are examples of measurement statement text that may be parsed into measurement statement objects according to one embodiment of the present invention.
Figure 3B:
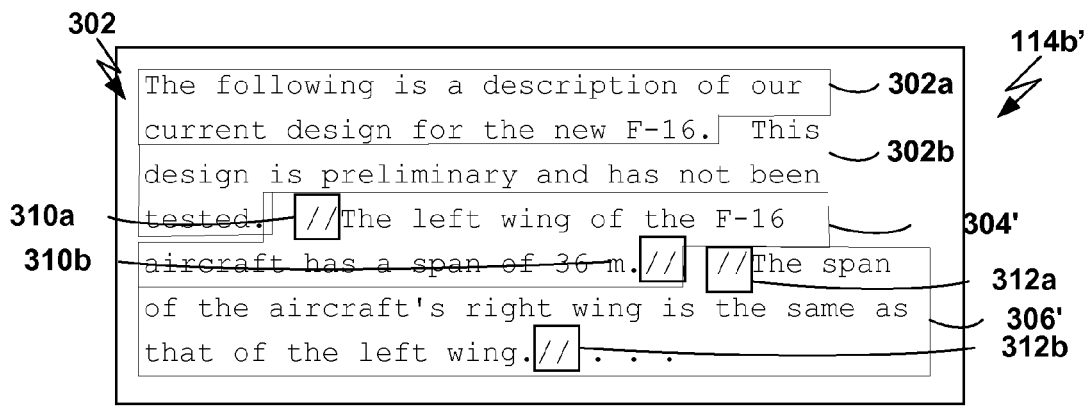

In such an embodiment, the author 110b of the memo 114b shown above may include "//" signals within the memo 114b to indicate to the parsing module 120 that the third and fourth sentences 304 are to be parsed into measurement statement objects, as shown by the alternative embodiment of the memo 114b' shown in FIG. 3B, which includes the following text:

The following is a description of our current design for the new F-16. This design is preliminary and has not been tested. //The left wing of the F-16 aircraft has a span of 36 m.// //The span of the aircraft's right wing is the same as that of the left wing.// . . . .

In the alternative memo 114b' shown in FIG. 3B, the first and second sentences 302a and 302b are the same as those in the original memo 114 of FIG. 3A. The third and fourth sentences 304' and 306' in FIG. 3B, however, include explicit signals 310a-b and 312a-b, respectively.

More generally, signals may be words, phrases, symbols, tags, document formatting (e.g., boldface or particular document styles), or other indicators that content is to be treated as measurement statement text to be parsed by the parsing module 120. For example, a user may include an SRD, in text format (with or without delimiters), within a document to indicate that the SRD text is to be parsed into a measurement statement object, as shown by the alternative embodiment of the memo 114b" shown in FIG. 3C, which includes the following text:

The following is a description of our current design for the new F-16. This design is preliminary and has not been tested.
//Aircraft:F-16/wing[left].span=36 m//
//wing[right].span=wing[left].span//

Figure 3C:
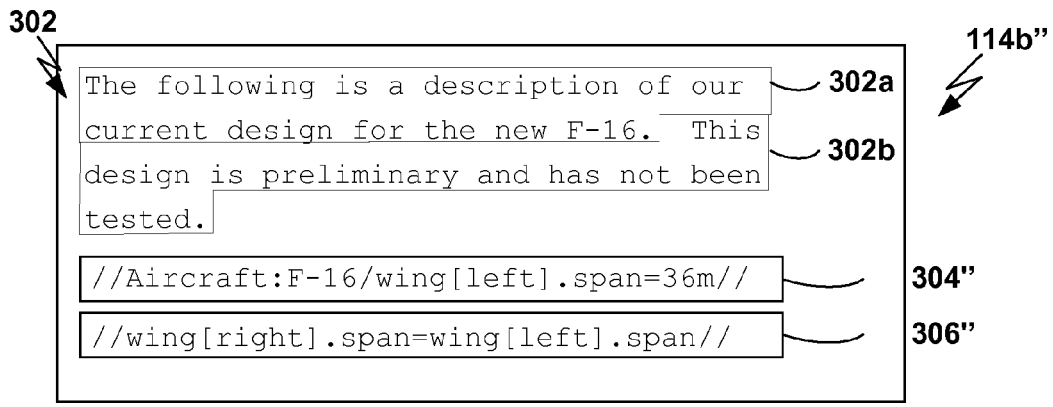

In the alternative memo 114b" shown in FIG. 3C, the first and second sentences 302a and 302b are the same as those in the original memo 114 of FIG. 3A. The third and fourth sentences 304" and 306" in FIG. 3C, however, include explicit signals, each of which takes the form of an SRD in text form.

The use of predetermined characters (e.g., "//" or "-") as signals is merely an example and does not constitute a limitation of the present invention. Alternatively, for example, the parsing module 120 may attempt to parse any content, whether or not delimited by express signals, which includes indications that the content represents a measurement. For example, in the case of the memo 114b illustrated in FIG. 3A, the parsing module 120 may be triggered by phrases by as "has a," "of," "is the same as," and the use of values with units such as "36 m," which indicate to the parsing module 120 that the corresponding sentences may represent measurements. More generally, the parsing module 120 may be triggered in whole or in part by clauses containing certain words, such as words representing known aspects (e.g., "length," "width," "area"), units (e.g., "feet," "seconds"), has-a relationships (e.g., "has a," "contains a") or is-a relationships (e.g., "is a"). As yet another example, the parsing module 120 may attempt to parse only sentences or clauses having a permissible syntax for measurement statement text (e.g., "The <part> of the <entity> has a <aspect> of <value>"). In any such case, the parsing module 120 may abort the parsing attempt if the text being parsed fails to yield an appropriate measurement statement object.

As illustrated by the variations of the memo 114b illustrated in FIGS. 3A-3C, the user-generated content 114a-d may include both natural-language content which is intended solely for communication to another human (e.g., "The following is a description of our current design for the new F-16") and content containing information about measurements which is suitable for being parsed by the parsing module 120 to create or modify a measurement statement object (e.g., "//The left wing of the F-16 aircraft has a span of 36 m.//"). The latter kind of content is referred to herein as "measurement statement text" and the former as "non-measurement statement text." The parsing module 120 may, therefore, include a mechanism for distinguishing between measurement statement text and non-measurement statement text, and for parsing only measurement statement text to produce the measurement statement objects 108a-n.

Regardless of how the parsing module 120 decides whether to parse any particular unit of content within a memo or other larger content, once the parsing module 120 parses a particular instance of measurement statement text, the parsing module 120 creates a measurement statement object representing the measurement described by the measurement statement text. As a result, the system 100 may process measurements in the user-created content 114a-d without requiring the engineers 110a-d to describe such measurements in an unnatural structured form in the content itself, and without requiring the engineers 110a-d to manually create structured representations of the measurements in objects outside the content, such as in separate database records.

As shown in FIG. 1A, the parsing module 120 may store measurement statement objects 108a-n that it creates in the measurement statement object store 106. The measurement statement object store 106 may, but need not be, stored separately from the content 114a-d that was parsed to create objects 108a-n in the object store 106. Rather, the measurement statement objects 108a-n may be stored within the content 114a-d itself, such as in the form of meta-data represented as SRDs or in other formats. Such meta-data may be stored within existing meta-data fields of conventional file formats (such as the EXIF portion of a JPEG file) or in any other suitable manner.

The number of measurement statement objects 108a-n in the store 106 grows as the users 110a-d create more content and the measurement statement text in such content 114a-d is parsed into measurement statement objects 108a-n. The users 110a-d may be provided with access to the measurement statement object store 106 in any of a variety of ways, as will be described in more detail below. One benefit of providing the users 110a-d with shared access to the measurement statement object store 106 is that the need for redundant data entry of measurement information may be eliminated. Another benefit is that measurement information provided by one of the users 110a-d may be used to validate measurement information provided by other ones of the users 110a-d. Examples of these and other techniques will be described in more detail below.

Note that in the various examples provided above of content that the parsing module 120 may parse to create measurement statement objects 108a-n, the content that serves as input to the parsing module 120 is the same as, or similar to, natural language content. As a result, the author of the content need not deviate significantly, or perhaps at all, from his normal writing style to create content that is both readable to a human (whether the author or someone else) and capable of being processed by a computer in a wide variety of ways. One reason the parsing module 120 is able to provide such a natural input language to the users 110a-d is that the destination structure—a measurement statement object represented as an SRD—contains elements whose content and arrangement maps closely to the way in which engineers naturally describe measurements.

A related benefit of embodiments of the present invention is that they enable measurements to be captured from measurement-related content that engineers already create in the course of their day-to-day work but which remains unusable for performing functions automatically such as computation, validation, searching, and reporting, because such content is stored in word processing documents, email messages, and other unstructured forms. Embodiments of the present invention transform the contents of existing engineering communications into measurement statement objects that are represented in a form that can be easily processed by a computer, with little or no additional effort required on the part of the engineers. As a result, embodiments of the present invention enable the content already created by engineers as part of their day-to-day work to become re-usable as computer-processable data for performing functions such as computation, validation, searching, and reporting, to the benefit not only of the individual engineers who created the original content, but to other engineers in the same organization and to the organization as a whole.

Furthermore, embodiments of the present invention do not merely provide a mechanism for conventional kinds of numerical data to be captured more easily, they enable a richer kind of data to be captured. In particular, embodiments of the present invention enable measurement statement objects to be created which represent complete measurements, not merely bare numerical values. For example, conventional mathematical software typically explicitly stores only the numerical value of a measurement (e.g., "22") in a computer-processable form, or perhaps the value and its units (e.g., "36 m"). Embodiments of the present invention, in contrast, store complete measurements including not only the value, but also the aspect of the measurement (e.g., "span") and the entity being measured (e.g., "the wing of the F-16"). Storing such additional information enables errors in computation to be avoided, such as by signaling an error when an attempt is made to add a span to a thickness. Conventional systems, which merely store numerical values and perhaps units, cannot detect such inconsistencies, particular when the units (e.g., inches) of both quantities being added are the same.

Certain implementations of embodiments of the present invention may require engineers and other users to write statement text using particular grammars. Even if such a requirement is imposed, however, it need not be overly burdensome on users, because such grammars may be the same as or very similar to the natural language grammars that users already use in their everyday communications. For example, an engineer may conform to the system's grammar by writing the text "the span of the F-16's wing is 36 m." Such text shares the grammar of natural English writing and therefore does not require the engineer to change his or her writing style. Even if certain natural grammars may be excluded by the system, users have already demonstrated their ability to adopt certain non-natural content in their everyday writing without undue burden. For example, we have all learned to refer to our uncle Fred Smith as fsmith23@yahoo.com, clearly an accommodation to Internet-speak intruding on our natural language.

Although in the examples described above all of the measurement statement objects 108a-n are derived from measurement statement text 114a-d written by users 110a-d of the system 100, this is not a limitation of the present invention. For example, the measurement statement objects 108a-n may include objects not created by users 110a-d of the system 100, such as measurement statement objects created by an administrator of the system 100 or imported into the system from another system. Such predetermined measurement statement objects may, for example, represent publicly-available measurements (e.g., "the height of the Empire State Building is 1453 feet") or physical constants (e.g., "Planck's constant is $6.626068 \times 10^{-34}$ $m^2$ kg/s").

The parsing module 120 may parse the content 114a-d at any time. For example, the parsing module 120 may monitor the content 114a-d as it is created and parse such content on the fly. Such functionality may be implemented, for example, by implementing the parsing module 120 as a plug-in (sometimes called a "helper application") to a word processor, email client, spreadsheet application, or other program, which monitors and parses content 114a-d as it is created by the users 110a-d, even before the users 110a-d store or transmit such content 114a-d. Such a plug-in may perform other functions, such as prompting the users 110a-d (e.g., using a drop-down list) with a set of acceptable signals from which to select.

As another example, the parsing module 120 may parse the content 114a-d when it is saved in the computing devices 112a-d or transmitted over the network 116. For example, the parsing module 120 may monitor all files maintained by a file system (e.g., in or accessible to the computing devices 112a-d) and parse any newly-saved or modified documents after they are saved or modified. The parsing module 120 may monitor all email messages transmitted by an email server or received by an email client and parse any email messages after they are transmitted or received. Such parsing may be performed, for example, either immediately, or after some delay to enable content to be processed in batches (e.g., nightly).

As another example, the parsing module 120 may only parse content that is specifically directed to the parsing module 120 by the users 110a-d or in some way. For example, a specific directory may be designated in a file system for files to be parsed by the parsing module 120. If one of the users 110a-d desires for a particular file to be parsed by the parsing module 120, the user may save the document (or a copy thereof) into the pre-designated directory. The parsing module 120 may parse only files saved into the pre-designated directory and no other files. As another example, a specific email address may be designated for email messages and/or documents to be parsed by the parsing module 120. If one of the users 110a-d desires for a particular email message and/or document to be parsed, the user may send the email message and/or document to the pre-designated email address. The user may transmit the same email message both to one or more human users and to the parsing module 120 by including multiple email addresses as recipients of the email message. The parsing module 120 may receive and parse all email messages and/or documents transmitted to the pre-designated email address and no other email messages and/or documents.

The parsing module 120 may be configured to parse measurement statement text according to one or more syntaxes (grammars). For example, the parsing module 120 may recognize measurement statement text written in the form "<entity> has <aspect>=<value>," "<entity> has <aspect> of <value>," "<aspect> of <entity> is <value>," and so on. The parsing module 120 may also be configured to handle text containing different verb tenses (e.g., "is," "was," "will be") and filler words (such as "the" in "the F-16's left wing has a span of 36 m"). Note the use of the possessive apostrophe in this example ("the F-16's left wing") to denote a part of (has a) relationship. Other variations on grammars that may be parsed by the parsing module 120 will be apparent to those having ordinary skill in the art. Furthermore, other grammars may be used in languages other than English.

In one embodiment of the present invention, the parsing module 120 may parse measurement statement text into the measurement statement objects 108a-n in two steps: (1) parsing measurement statement text into measurement statement scripts, expressed in an intermediate language, and (2) converting the measurement statement scripts into measurement statement objects. A script statement may take a form such as <entity>.<aspect>=<value>. This two-step parsing process is merely an example, however, and does not constitute a limitation of the present invention. In one embodiment, the resulting measurement statement objects are represented as RDF triples in XML.

Measurement statement objects 108a-n in the measurement statement object store 106 may reference each other. A reference to one of the measurement statement objects 108a-n may refer to the entire measurement statement object or to any element of the measurement statement object, such as its value object, aspect object, or entity object.

One measurement statement object may refer to another measurement statement object in any of a variety of ways, for any of a variety of purposes. For example, a first measurement statement object A may refer to a second measurement statement object B to access the value of object B, as in the following example: "the span of the F-16's left wing is equal to the span of the F-16's right wing." Assuming that a measurement statement object representing the span of the F-16's right wing already exists in the measurement statement object store 106, such a statement may be used to assign the value of the span of the F-16's right wing from one measurement statement object to the span of the F-16's left wing in another measurement statement object.

Note that such a value assignment may be performed by the parsing module 120 or other component of the computing device 118 in response to parsing text, such as "the span of the F-16's left wing is equal to the span of the F-16's right wing," in the content 114a-d. The process 200 described above in connection with FIG. 2A, of parsing measurement statement text to create a new measurement statement object, is therefore merely an example of one process that the computing device 118 may perform in response to the content 114a-d. Accessing information stored in existing measurement statement objects 108a-n and modifying that information are other examples of processes that the computing device 118 may perform in response to the content 114a-d.

As another example, a reference to object A may refer to object B to perform a computation involving object B, as in the following example: "the area of the room is equal to the square of the room's width." Assuming that a measurement statement object representing the room's width already exists in the measurement statement object store 106, in response to such a statement the parsing module 120 or other component may calculate the square of the room's width and assign the resulting value to a measurement statement object representing the room's area. Note that the result of the squaring operation may itself be a measurement statement object having a value object, an aspect object, and an entity object. This is just one example of how performing a computation on a measurement statement object can yield another measurement statement object.

Although in the example just described, a single-operand computation (square) is performed, the computation module 124 may perform computations having any number of operands. Each such operand may be a measurement statement object, and the output of the computation may be a measurement statement object. For example, in response to the text, "the room's area is equal to the room's width multiplied by the room's height," the computation module may perform a computation on measurement statement objects representing the room's width and the room's height and store the result in a measurement statement object representing the room's area. Such a computation may involve performing a computation on the values of each input measurement object, and storing the resulting value (e.g., product) in the output measurement object.

The aspect and entity of the measurement statement object resulting from a computation may be identified in any of a variety of ways. For example, the computation module 100 may be configured to know which output aspect results from performing particular computations on particular input aspects. As one example, the computation module 124 may know that multiplying a width by a height results in an area, and therefore may set the aspect of the resulting output measurement statement object to "area." As another example, the instruction to the computation module 124 may specify the aspect of the output measurement statement object, as in the case where "the room's area is equal to the room's width multiplied by the room's height" specifies that the output aspect is "area." The entity of the output measurement statement object may be copied from the entity of the input measurement statement objects (e.g., "room" in the example just provided).

As another example, a measurement statement object may refer to an existing measurement statement object to modify the value of the existing object, as in the following example:

"the thickness of the protective oxide layer has changed to 50 microns." Assuming that a measurement statement object representing the thickness of the protective oxide layer already exists in the measurement statement object store 106, in response to such a statement the parsing module 120 or other component may modify that object's value object to represent a value of 50 microns. The system 100 may, but need not, store a log of previous values of elements of the measurement statement objects 108*a-n*.

Figure 2C:
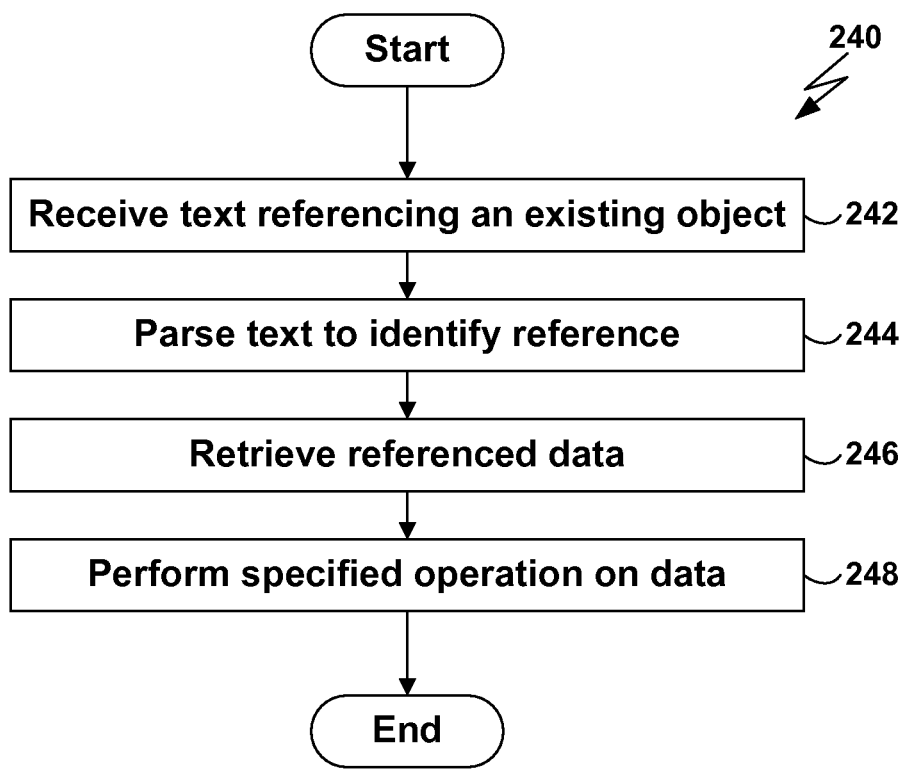
FIG. 2C is a flowchart of a method for performing an operation on an existing measurement statement object according to one embodiment of the present invention.

The examples above are instances of the general process 240 illustrated in FIG. 2C, in which the parsing module 120 receives text which references an existing measurement statement object in the measurement statement object store 106 (step 242). Such a reference may refer to any element of the measurement statement object, such as its value, aspect, or entity. The parsing module 120 parses the text (step 244) and provides a representation of the parsed text to a computation module 124. The computation module 124 retrieves the referenced data (such as the room's existing width) (step 246) and performs the specified operation on the data (such as squaring the width) (step 248). The operation may also include storing the result in an element (e.g., the value of the room's area) of a measurement statement object.

Note that although in the preceding examples, the computation module 124 performs computations on data stored in the measurement statement objects 108*a-n* in response to instructions received from users 110*a-d* in the form of text and other content 114*a-n*, this is merely an example and does not constitute a limitation of the present invention. Rather, the computation module 124 may perform computations on data stored in the measurement statement object store 106 in response to any stimulus, such as instructions received from other software or from hardware devices under program control.

A reference to an existing measurement statement object may or may not include a complete descriptor of the existing measurement statement object, in which case elements of the system 100 (such as the parsing module 120 and computation module 124) may use context information to identify the measurement statement object being referenced. For example, assume that the measurement statement object store 106 contains a measurement statement object representing the left wing of an F-16. A reference to "the wing of the F-16" is potentially ambiguous because it does not specify that the wing being referenced is the left wing. In such a case, the system 100 may attempt to disambiguate the reference by, for example, searching the measurement statement object store 106 for measurement statement objects representing F-16 wings. If the only such existing object is an object representing the F-16's left wing, then the system 100 may conclude that the reference to "the wing of the F-16" is a reference to the left wing of the F-16 and process the reference accordingly.

The context information associated with a particular reference may, however, be identified in other ways. For example, the users 110*a-d* may provide such context information before providing the reference. For example, one of the users 110*a-d* may provide a "context" command to the system 100, indicating that the current context is the F-16's left wing. The system 100 may then interpret all subsequent references within this context until the context changes.

As another example, a user may provide content 114*a-d* to the system 100 in distinct sets of content, each of which the user may associate with a particular context by attaching a label (such as in the form of an SRD) or other context identifier to the set. All statements within a set of content may be interpreted by the system 100 in the context defined by the associated context identifier. For example, the context identifier for a particular set of content may specify the resource "F-16 wing," in which case the system 100 may interpret all statements within that set of content as having the context "F-16 wing."

Although measurement statement objects 108*a-n* may refer to other ones of the measurement statement objects 108*a-n*, not all statements that refer to measurement statement objects 108*a-n* need themselves be measurement statement objects. Rather, the measurement statement data store 106 may include statement objects 111*a-m* that are not measurement statement objects, but which refer to measurement statement objects 108*a-n*. may refer to measurement statement objects. For example, one of the statement objects 111*a-m* A may indicate that an existing one of the measurement statement objects 108*a-n* B is invalid, expired, an estimated, an actual measured value, or an adopted standard. In this example, the referring statement object A need not be a measurement statement object because it does not represent a measurement. Rather, it represents a non-measurement property of measurement statement object B.

Figure 4A:
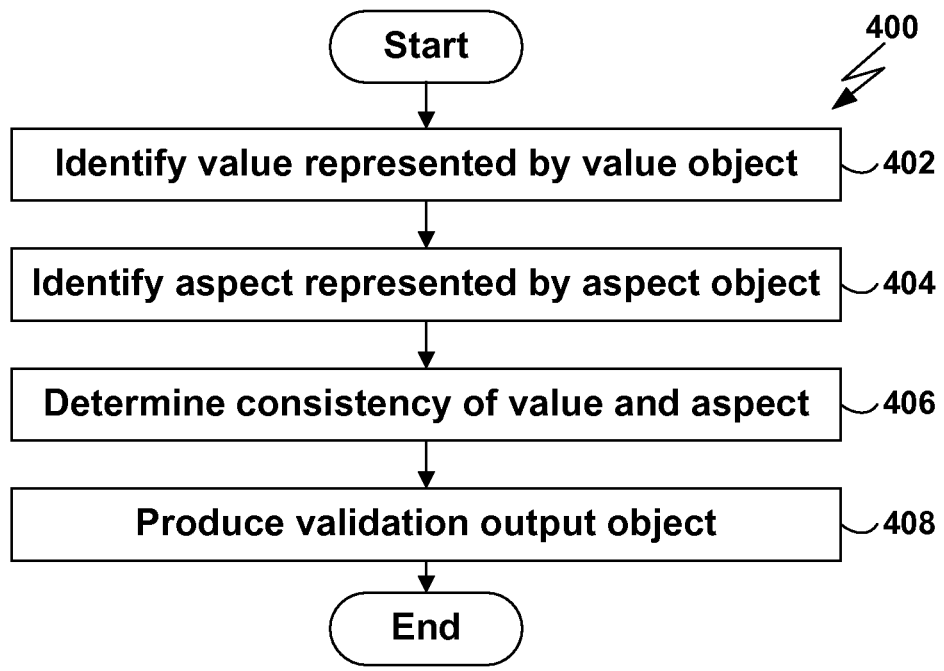
FIG. 4A, FIG. 4B and FIG. 4C are flowcharts of methods for validating measurement statement objects according to various embodiments of the present invention.

The system 100 may include a validation module 126 that validates the contents of measurement statement objects 108*a-n* in a variety of ways. For example, as illustrated by the method 400 of FIG. 4, the validation module 126 may determine whether the value represented by the value object of one of the measurement statement objects 108*a-n* (step 402) is consistent with the aspect (step 404) represented by the aspect object of the same measurement statement object (step 406). The validation module 126 may produce an output object 134 indicating whether the value and aspect are consistent with each other (step 408). An example of a value that is inconsistent with an aspect is the statement text, "thickness of oxide layer is 37 seconds," because the units (seconds) of the value "37 seconds" is not a kind of thickness (the aspect).

Figure 4B:
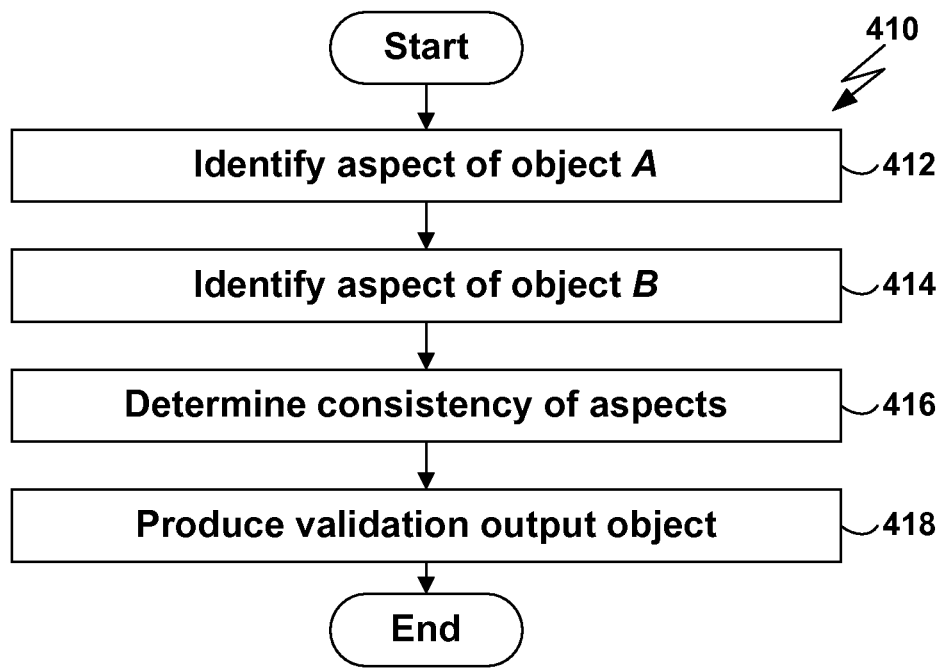

As another example, and as illustrated by the method 410 of FIG. 4B, the validation module 126 may determine whether the aspect represented by the aspect object of one of the measurement statement objects 108*a-n* (step 412) is consistent with the aspect (step 414) represented by the aspect object of a different measurement statement object (step 416). In this case, the output object 134 may indicate whether the aspects of the two measurement statement objects are consistent with each other (step 418). The validation module 126 may, for example, determine whether the aspects of two measurement statement objects are consistent with each other when the computation module 124 attempts to perform a computation on the two measurement statement objects. For example, if one of the users 110*a-d* provides measurement statement text stating, "the sum of the thickness of the oxide layer and the volume of the cavity," the computation module 124 may first use the validation module 126 to validate this statement, which may include determining that the two aspects (thickness and volume) are inconsistent with each other. In response, the system 100 may signal an error and refuse to perform the requested computation.

Figure 4C:
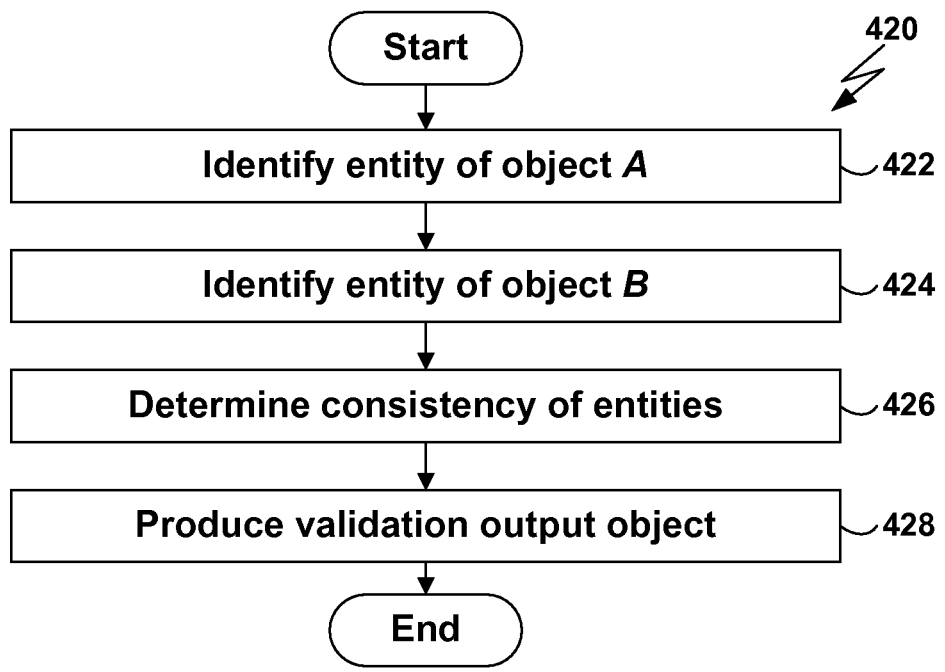

As yet another example, and as illustrated by the method 420 of FIG. 4C, the validation module 126 may determine whether the entity represented by the entity object of one of the measurement statement objects 108*a-n* (step 422) is consistent with the entity (step 414) represented by the entity object of a different measurement statement object (step 426). In this case, the output object 134 may indicate whether the entities of the two measurement statement objects are consistent with each other (step 428). The validation module 126 may, for example, determine whether the entities of two measurement statement objects are consistent with each other when the computation module 124 attempts to perform a computation on the two measurement statement objects. For example, if one of the users 110*a-d* provides measurement statement text stating, "the product of the width of the living room and the length of the dining room," the computation module 124 may first use the validation module 126 to validate this statement, which may include determining that the two entities (living room and dining room) are inconsistent with (e.g., not equal to) each other. In response, the system 100 may signal an error and refuse to perform the requested computation.

The validation module 126 may perform validation in any of a variety of ways. For example, the system 100 may store information about relationships among unit types (e.g., inches, seconds) and aspects (e.g., thickness, duration), such as by using referential objects 111*a-m*. For example, the system 100 may store an indication that "inches," "feet," and "yards" (unit types) are all measurements of "thickness" and "distance" (aspects). Such indications may form paths of relationships that the validation module 126 may use to perform validation. For example, the validation engine 126 may conclude that two aspects are inconsistent with each other if the two aspects do not share a common ancestor, as indicated by the paths of relationships stored in the system 100.

The system 100 may include a validation module 126 that validates the contents of measurement statement objects 108*a-n* in a variety of ways. For example, as illustrated by the method 400 of FIG. 4A, the validation module 126 may determine whether the value represented by the value object of one of the measurement statement objects 108*a-n* (step 402) is consistent with the aspect (step 404) represented by the aspect object of the same measurement statement object (step 406). The validation module 126 may produce an output object 134 indicating whether the value and aspect are consistent with each other (step 408). An example of a value that is inconsistent with an aspect is the statement text, "thickness of oxide layer is 37 seconds," because the units (seconds) of the value "37 seconds" is not a kind of thickness (the aspect).

The query 138 may also, for example, take a form such as, "list all parts of the F-16 left wing," which may be represented as an SRD containing a wildcard term, such as "F-16/wing:left/*". The SRD structure makes it easy to formulate and process such a query, which would be difficult to formulate and process in conventional systems lacking the richness of the SRD.

The output of the reporting module 136 may take any form. For example, the reporting module 136 may provide search results 140 in the form of SRDs (e.g., "Aircraft:F-16/wing[left].span=36 m") or in the form of natural language sentences (e.g., "The span of the F-16 Aircraft's left wing is thirty-six meters."

The reporting module 136 may also perform searches and provide query results 140 automatically. For example, user 110*a* may register with the reporting module 136 to be notified upon any change to a particular one of the measurement statement objects 106 or a particular element thereof (such as its value object, aspect object, or entity object). Thereafter, the reporting module 136 may automatically notify the user 110*a* upon any such change to the specified measurement statement object. One way in which this function may be performed is for the user 110*a* to provide a query to the reporting module 136 once, and for the reporting module 136 to automatically run the query periodically (e.g., daily) thereafter and to notify the user 110*a* of any new results generated.

As another example, the reporting module 136 may notify the user 110*a* if metadata referencing a particular measurement statement object has been created or modified. Such metadata may, for example, be a comment about the measurement statement object or other kind of statement which refers to the measurement statement object. In this and other examples, the output of the reporting module 136 may take any form. For example, the reporting module 136 may output images to indicate whether a particular measurement statement object has any metadata attached to it, and/or whether such metadata has been recently added or changed. For example, the reporting module 136 may output a blank image if the measurement statement object has no metadata attached to it (or if the attached metadata has not changed during some relevant time period), but output an image of a red flag if the measurement statement object has metadata attached to it (or if the attached metadata was added or changed recently). Such functionality may be implemented, for example, in a web page by including an IMG tag which contains an identifier of a measurement statement object. The IMG tag may be used to query the reporting module 136, which may dynamically retrieve and provide an appropriate image for the measurement statement object (such as a blank image or red flag) in response. Although in this particular example the reporting module 136 provides the image in response to a specific query, alternatively the reporting module 136 may automatically and periodically provide such images based on the metadata (or lack thereof) associated with a particular measurement statement object.

Although in the examples just provided, queries 138 are provided by users 110*a-d* and the output 140 of queries is provided to users 110*a-d*, such queries 138 may alternatively be provided by software programs and the results provided to such software programs using any suitable communications mechanism.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Although certain data structures, such as measurement statement objects, value objects, aspect objects, and entity objects are referred to herein as "objects," such data structures need not be represented as objects within the meaning of object-oriented programming. Rather, the term "object" refers herein more generally to any unit of stored data.

Furthermore, only in certain examples disclosed herein, measurement statement text is written in a natural language, this is not a requirement of the present invention. Rather, measurement statement text may take any form. For example, "measurement statement text" need not be represented as text or be represented solely as text. For example, measurement statement text may be represented as data stored in multiple cells in a spreadsheet.

Although measurement statement objects are described herein as containing value objects, aspect objects, and entity objects, measurement statement objects may include additional objects. For example, a measurement statement object may include an object indicating that the measurement represented by the measurement statement object is a requirement or an estimate. Furthermore, any data described herein as being stored within a particular object may instead be stored in a separate object. For example, although the units of a value may be stored within a value object, alternatively the units may be stored within a separate units object.

It was stated above that a measurement statement object, and any object contained therein, may be represented as a structured resource descriptor (SRD). This implies that any such object may further contain one or more SRDs, and so on recursively to any depth. As a result, a measurement statement object may recursively define a hierarchy of contextual information about the measurement represented by the measurement statement object.

The particular characters used to represent SRD operators, such as "/" and ":", are merely examples and do not constitute limitations of the present invention. Rather, any characters or other kind of data may be used to represent operators within an SRD. More generally, an SRD may be represented in any format. Furthermore, SRDs need not include all of the operators described herein. For example, SRDs need not include the qualifier operator (e.g., "[ ]"). Furthermore, SRDs may include operators in addition to those disclosed herein.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

All patents, patent applications, and published references cited herein are hereby incorporated by reference in their entirety. It will be appreciated that several of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for representing a measurement of an aspect of a physical object as a measurement statement about the physical object and including the measurement statement in host electronic content, the method comprising:
    parsing at least the measurement statement to electronically represent the measurement statement of the physical object as a measurement statement object including a plurality of computer-processable data objects comprising:
        an entity object representing the physical object;
        an aspect object representing the aspect of the physical object for which the measurement is made; and
        a value object representing a value of the measurement made on the aspect of the physical object; and
    including the measurement statement for the physical object as a text entity in the host electronic content, wherein:
    a human reader of the host electronic content can read the text entity to understand the measurement statement;
    the measurement statement is retrievable on command separately from other content in the host electronic content;
    the host electronic content is not a compilable programming language; and
    the plurality of computer-processable data objects of the measurement statement object electronically representing the measurement statement facilitate at least one of computation, validation, searching, and reporting relating to the measurement of the aspect of the physical object, and
wherein:
    the physical object has a kind and a part; and
    at least a portion of the measurement statement corresponding to the entity object is formatted as a computer-processable structured resource descriptor (SRD) comprising:
        an entity identifier identifying the physical object; and
        at least one of:
            a first operator specifying the kind of the physical object; and
            a second operator specifying the part of the physical object, and
    wherein the SRD further comprises:
        a third operator specifying the aspect of the physical object for which the measurement is made;
        an aspect identifier identifying the aspect of the physical object for which the measurement is made; and
        a value identifier identifying the value of the measurement of the aspect of the physical object, and wherein:
  the first operator specifying the kind of the physical object is a colon ":";
  the second operator specifying the part of the physical object is a backslash "/"; and
  the third operator specifying the aspect of the physical object is a period ".", and
wherein the SRD further comprises:
  a kind identifier identifying the kind of the physical object; and
  a part identifier identifying the part of the physical object,
  such that the SRD has the form:
    "entity identifier:kind identifier/part identifier.aspect identifier=value identifier".

2. The method of claim 1, further comprising
  receiving additional information relating to the physical object; and
  storing the additional information relating to the physical object as part of the measurement statement.

3. The method of claim 2, wherein the additional information is selected from the group consisting of a second measurement statement and contextual information concerning the physical object.

4. The method of claim 1, wherein the plurality of computer-processable data objects are stored in a repository with metadata concerning an origin or a nature of the measurement statement.

5. The method of claim 1, wherein the host electronic content is selected from the group consisting of a word processing document, an e-mail and a spreadsheet.

6. The method of claim 1, wherein the measurement statement is portable, such that it is useful in a plurality of types of applications on a plurality of types of computers without modifying the measurement statement.

7. The method of claim 1, where the value object comprises a number object representing a number and a unit object representing a unit of measurement.

8. A method for representing a measurement of an aspect of a physical object as a measurement statement about the physical object and including the measurement statement in host electronic content, the method comprising:
  parsing at least the measurement statement to electronically represent the measurement statement of the physical object as a measurement statement object including a plurality of computer-processable data objects comprising:
    an entity object representing the physical object;
    an aspect object representing the aspect of the physical object for which the measurement is made; and
    a value object representing a value of the measurement made on the aspect of the physical object; and
  including the measurement statement for the physical object as a text entity in the host electronic content, wherein:
  a human reader of the host electronic content can read the text entity to understand the measurement statement;
  the measurement statement is retrievable on command separately from other content in the host electronic content;
  the host electronic content is not a compilable programming language; and
  the plurality of computer-processable data objects of the measurement statement object electronically representing the measurement statement facilitate at least one of computation, validation, searching, and reporting relating to the measurement of the aspect of the physical object, and
wherein:
  the physical object has a kind and a part; and
  at least a portion of the measurement statement corresponding to the entity object is formatted as a computer-processable structured resource descriptor (SRD) comprising:
    an entity identifier identifying the physical object; and
    at least one of:
      a first operator specifying the kind of the physical object; and
      a second operator specifying the part of the physical object, and
wherein the SRD further comprises:
  a third operator specifying the aspect of the physical object for which the measurement is made;
  an aspect identifier identifying the aspect of the physical object for which the measurement is made; and
  a value identifier identifying the value of the measurement of the aspect of the physical object, and
wherein:
  the first operator specifying the kind of the physical object is a colon ":";
  the second operator specifying the part of the physical object is a backslash "/"; and
  the third operator specifying the aspect of the physical object is a period ".", and
wherein the SRD further comprises:
  a kind identifier identifying the kind of the physical object;
  a part identifier identifying the part of the physical object;
  a fourth operator specifying a qualifier of the part of the physical object; and
  a qualifier identifier identifying the qualifier of the part of the physical object, and
wherein:
  the fourth operator specifying the qualifier of the part of the physical object is a bracket set "[ ]",
  such that the SRD has the form:
    "entity identifier:kind identifier/part identifier[qualifier identifier].aspect identifier=value identifier".

9. A method for representing a measurement of an aspect of a physical object as a measurement statement about the physical object and including the measurement statement in host electronic content, the method comprising:
  electronically representing the measurement statement of the physical object as a measurement statement object including a plurality of computer-processable data objects comprising:
    an entity object representing the physical object;
    an aspect object representing the aspect of the physical object for which the measurement is made; and
    a value object including a value of the measurement made on the aspect of the physical object; and
  embedding the measurement statement for the physical object in the host electronic content, wherein:
  the measurement statement is retrievable on command separately from other content in the host electronic content;
  the plurality of computer-processable data objects of the measurement statement object representing the measurement statement facilitate at least one of computation, validation, searching, and reporting relating to the measurement of the aspect of the physical object;
  the host electronic content is selected from the group consisting of a word processing document, an e-mail and a spreadsheet; and the measurement statement is portable, such that it is useful in a plurality of different kinds of the host electronic content without modifying the measurement statement, and wherein:
the physical object has a kind and a part; and
at least a portion of the measurement statement corresponding to the entity object is formatted as a computer-processable structured resource descriptor (SRD) comprising:
an entity identifier identifying the physical object; and
at least one of:
a first operator specifying the kind of the physical object; and
a second operator specifying the part of the physical object,
wherein the SRD further comprises:
a third operator specifying the aspect of the physical object for which the measurement is made:
an aspect identifier identifying the aspect of the physical object for which the measurement is made; and
a value identifier identifying the value of the measurement of the aspect of the physical object,
wherein:
the first operator specifying the kind of the physical object is a colon ":";
the second operator specifying the part of the physical object is a backslash "/"; and
the third operator specifying the aspect of the physical object is a period ".", and
wherein the SRD further comprises:
a kind identifier identifying the kind of the physical object; and
a part identifier identifying the part of the physical object, such that the SRD has the form:
"entity identifier:kind identifier/part identifier.aspect identifier=value identifier".

10. A method for representing a measurement of an aspect of a physical object as a measurement statement about the physical object and including the measurement statement in host electronic content, the method comprising:
electronically representing the measurement statement of the physical object as a measurement statement object including a plurality of computer-processable data objects comprising:
an entity object representing the physical object;
an aspect object representing the aspect of the physical object for which the measurement is made; and
a value object including a value of the measurement made on the aspect of the physical object; and
embedding the measurement statement for the physical object in the host electronic content, wherein:
the measurement statement is retrievable on command separately from other content in the host electronic content;
the plurality of computer-processable data objects of the measurement statement object representing the measurement statement facilitate at least one of computation, validation, searching, and reporting relating to the measurement of the aspect of the physical object;
the host electronic content is selected from the group consisting of a word processing document, an e-mail and a spreadsheet; and
the measurement statement is portable, such that it is useful in a plurality of different kinds of the host electronic content without modifying the measurement statement, and wherein:
the physical object has a kind and a part; and
at least a portion of the measurement statement corresponding to the entity object is formatted as a computer-processable structured resource descriptor (SRD) comprising:
an entity identifier identifying the physical object; and
at least one of:
a first operator specifying the kind of the physical object; and
a second operator specifying the part of the physical object,
wherein the SRD further comprises:
a third operator specifying the aspect of the physical object for which the measurement is made;
an aspect identifier identifying the aspect of the physical object for which the measurement is made; and
a value identifier identifying the value of the measurement of the aspect of the physical object,
wherein:
the first operator specifying the kind of the physical object is a colon ":";
the second operator specifying the part of the physical object is a backslash "/"; and
the third operator specifying the aspect of the physical object is a period ".", and
wherein the SRD further comprises:
a kind identifier identifying the kind of the physical object;
a part identifier identifying the part of the physical object;
a fourth operator specifying a qualifier of the part of the physical object; and
a qualifier identifier identifying the qualifier of the part of the physical object, and
wherein:
the fourth operator specifying the qualifier of the part of the physical object is a bracket set "[ ]",
such that the SRD has the form:
"entity identifier:kind identifier/part identifier[qualifier identifier].aspect identifier=value identifier".

11. A method for representing a measurement of an aspect of a physical object as a measurement statement about the physical object and including the measurement statement in host electronic content, the method comprising:
electronically representing the measurement statement of the physical object as a measurement statement object including a plurality of computer-processable data objects comprising:
an entity object representing the physical object;
an aspect object representing the aspect of the physical object for which the measurement is made; and
a value object including a value of the measurement made on the aspect of the physical object; and
storing the measurement statement for the physical object in the host electronic content,
wherein:
the measurement statement has a natural-language representation for embedding the measurement statement in the host electronic content;
the measurement statement has a human-readable defined syntax;
the measurement statement is portable, such that it is useful in a plurality of different kinds of host electronic content without modifying the measurement statement;
the host electronic content is selected from the group consisting of text-based content, image content, audio content and video content; and the plurality of computer-processable data objects of the measurement statement object representing the measurement statement facilitate at least one of computation, validation, searching, and reporting relating to the measurement of the aspect of the physical object, and
wherein:
the physical object has a kind and a part; and
at least a portion of the measurement statement corresponding to the entity object is formatted as a computer-processable structured resource descriptor (SRD) comprising:
an entity identifier identifying the physical object; and
at least one of:
a first operator specifying the kind of the physical object; and
a second operator specifying the part of the physical object,
wherein the SRD further comprises:
a third operator specifying the aspect of the physical object for which the measurement is made;
an aspect identifier identifying the aspect of the physical object for which the measurement is made; and
a value identifier identifying the value of the measurement of the aspect of the physical object,
wherein:
the first operator specifying the kind of the physical object is a colon ":";
the second operator specifying the part of the physical object is a backslash "/"; and
the third operator specifying the aspect of the physical object is a period ".", and
wherein the SRD further comprises:
a kind identifier identifying the kind of the physical object; and
a part identifier identifying the part of the physical object, such that the SRD has the form:
"entity identifier:kind identifier/part identifier.aspect identifier=value identifier".

12. The method of claim 11, further comprising:
parsing at least the measurement statement to electronically represent the measurement statement of the physical object as the measurement statement object.

13. The method of claim 11, wherein:
the host electronic content includes metadata; and
the measurement statement is stored in the metadata.

14. The method of claim 13, wherein the host electronic content is selected from the group consisting of the image content, the audio content and the video content.

15. A method for representing a measurement of an aspect of a physical object as a measurement statement about the physical object and including the measurement statement in host electronic content, the method comprising:
electronically representing the measurement statement of the physical object as a measurement statement object including a plurality of computer-processable data objects comprising:
an entity object representing the physical object;
an aspect object representing the aspect of the physical object for which the measurement is made; and
a value object including a value of the measurement made on the aspect of the physical object; and
storing the measurement statement for the physical object in the host electronic content,
wherein:
the measurement statement has a natural-language representation for embedding the measurement statement in the host electronic content;
the measurement statement has a human-readable defined syntax;
the measurement statement is portable, such that it is useful in a plurality of different kinds of host electronic content without modifying the measurement statement;
the host electronic content is selected from the group consisting of text-based content, image content, audio content and video content; and
the plurality of computer-processable data objects of the measurement statement object representing the measurement statement facilitate at least one of computation, validation, searching, and reporting relating to the measurement of the aspect of the physical object, and
wherein:
the physical object has a kind and a part; and
at least a portion of the measurement statement corresponding to the entity object is formatted as a computer-processable structured resource descriptor (SRD) comprising:
an entity identifier identifying the physical object; and
at least one of:
a first operator specifying the kind of the physical object; and
a second operator specifying the part of the physical object,
wherein the SRD further comprises:
a third operator specifying the aspect of the physical object for which the measurement is made;
an aspect identifier identifying the aspect of the physical object for which the measurement is made; and
a value identifier identifying the value of the measurement of the aspect of the physical object,
wherein:
the first operator specifying the kind of the physical object is a colon ":";
the second operator specifying the part of the physical object is a backslash "/"; and
the third operator specifying the aspect of the physical object is a period ".", and
wherein the SRD further comprises:
a kind identifier identifying the kind of the physical object;
a part identifier identifying the part of the physical object;
a fourth operator specifying a qualifier of the part of the physical object; and
a qualifier identifier identifying the qualifier of the part of the physical object, and
wherein:
the fourth operator specifying the qualifier of the part of the physical object is a bracket set "[ ]",
such that the SRD has the form:
"entity identifier:kind identifier/part identifier[qualifier identifier].aspect identifier=value identifier".

* * * * *